Patented Jan. 14, 1941

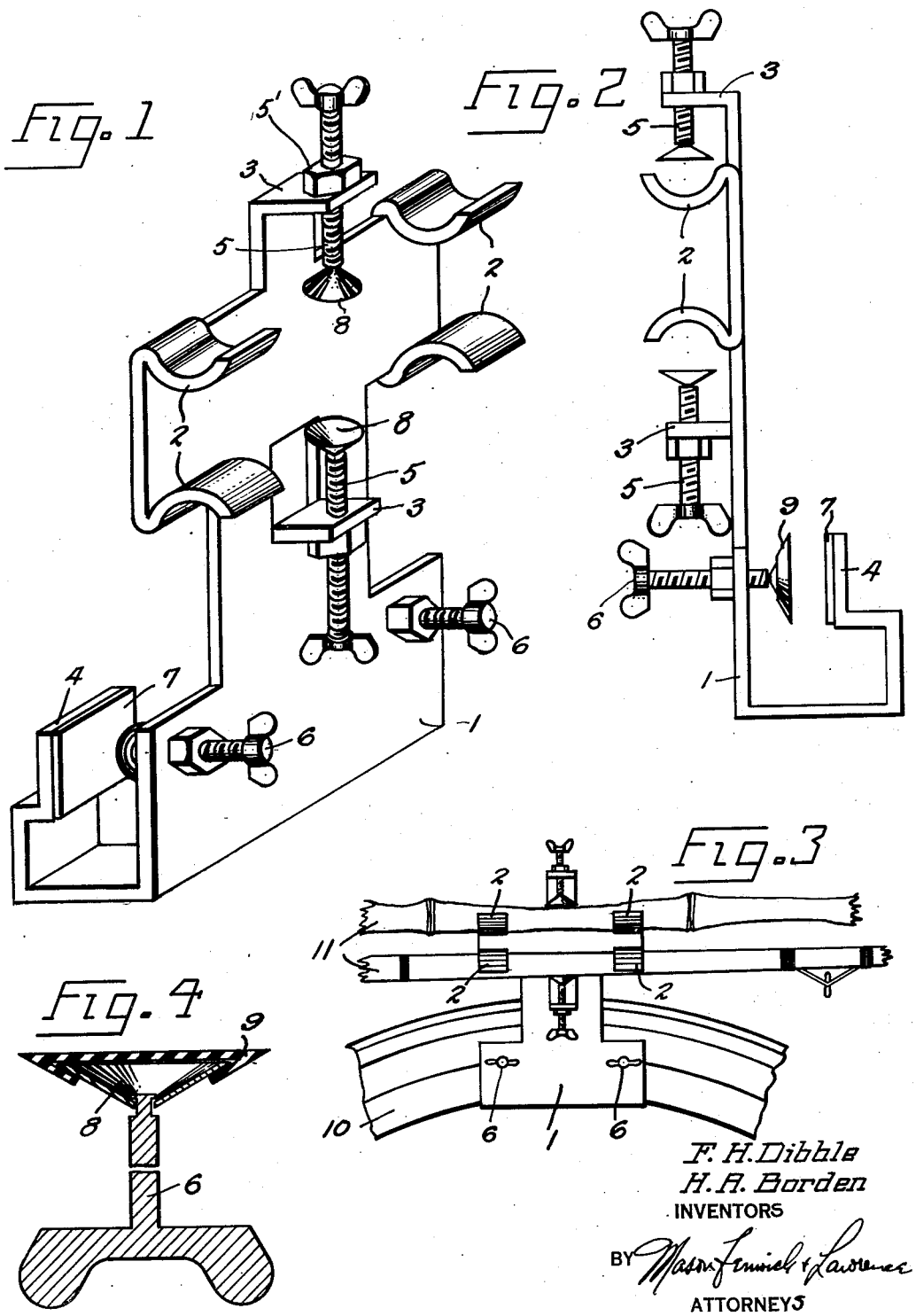

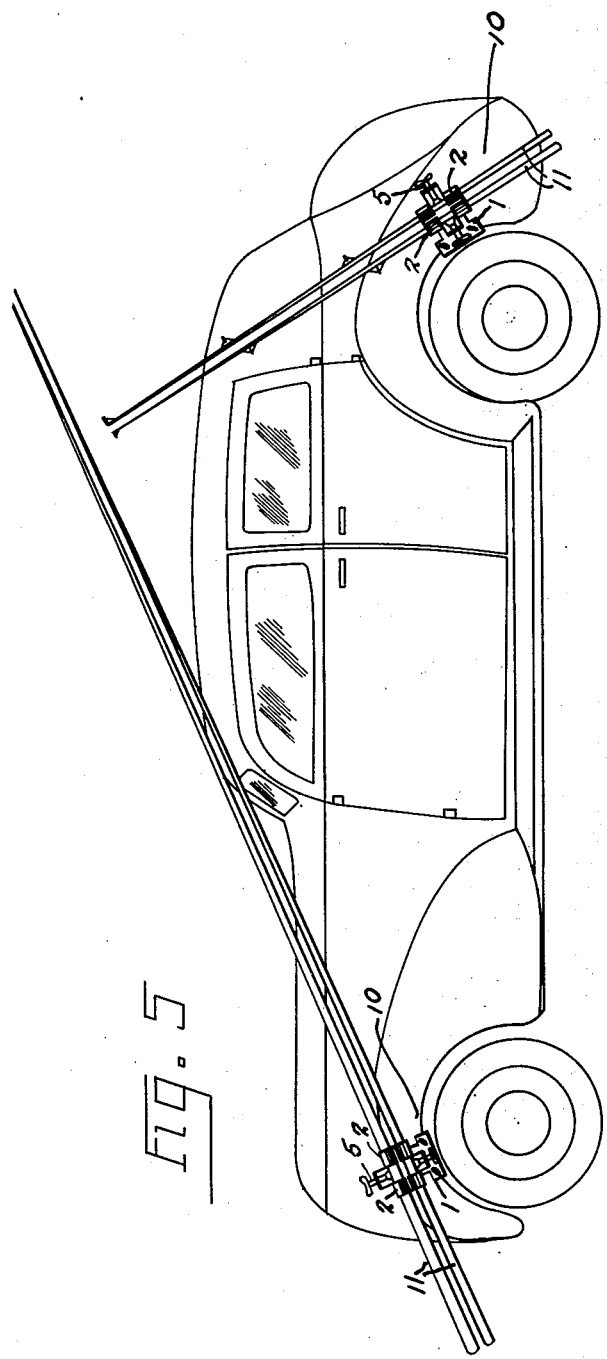

2,228,593

UNITED STATES PATENT OFFICE 2,228,593

FISH ROD CARRIER

Frank Howard Dibble and Harold Allan Borden, Miami, Fla.

Application February 15, 1939, Serial No. 256,566

1 Claim. (Cl. 224—29)

This invention pertains to improvements in a carrier to be secured to a vehicle for support of poles, such as tent poles, fishing poles, and the like.

Frequently, on trips to fishing grounds, or camping, it is desirable to carry several fishing rods on an automobile, with the fishing tackle in readiness for immediate use. On some occasions it may be desirable to attach such rods to one part of an automobile and on other occasions to some other part. This has been exceedingly inconvenient, if not impossible, when the fishing rods have varied considerably from each other in length or diameter, or in type of tackle that they carry.

One object of this invention is to provide an improved carrier of a sort to grip different parts of a vehicle in positive, dependable manner yet be exceedingly flexible as to the size of poles or rods to be carried. Also, an object is to devise means to secure poles in various positions or at various angles on an automobile, for example. Hence, unitary means are sought herein to fasten a group of poles at will on one fender or another, or at any position on any similar projection of an automobile. A further object is to provide for carrying several poles securely on a car by a single attachment and in such manner as not to interfere with the operation of any doors, windows or other parts of the car.

An especially valuable consequence of this invention is that manufacture thereunder lends itself to quantity production methods that are simple and inexpensive. Also, a purpose of importance is to manufacture a multiple rod-carrier largely in a single piece of material, particularly a carrier that may in large part be stamped from metal or may be molded from suitable material, and yet be of sturdy structure.

This invention also seeks to produce a carrier that will be simple to assemble, and simple but rapid and dependable in use. These, and other objects, will become more apparent with further and more detailed description of a preferred embodiment of this invention.

A preferred embodiment of this invention is illustrated in the accompanying drawings, and the scope of the invention is more fully pointed out in the appended claim.

In the drawings:

Figure 1 represents a perspective view exhibiting the front face and the base of a carrier formed in accordance with this invention;

Figure 2 illustrates an end view of the carrier shown in Figure 1;

Figure 3 shows in front view a carrier containing a plurality of fishing rods and attached to an automobile fender;

Figure 4 illustrates in cross section a preferred means for securing a carrier to objects which it is to grip;

Figure 5 represents an assemblage of carriers attaching a plurality of fishing rods in different representative positions to different fenders of an automobile.

Various benefits in manufacturing, as well as in use of this invention, are attained in a carrier formulated with a single broad face plate that is upstanding from an integral base. The base is adapted to grip a variety of projecting supports. From this upstanding broad face are struck out a plurality of cradle members curved to support a rod. Also, outstanding tabs are struck out between the cradle members to secure a gripping element that is adapted to press against the pole in opposed relation to the cradle members.

Referring more particularly to the drawings, which illustrate the present preferred form of this invention, there is shown an extensive face plate 1 from which a base portion extends back in generally U-shaped form. Preferably as shown, the rear leg of the U is angularly inclined forward to form a throat and to include a recess capable of fitting over the inner bead of an automobile fender, for example, to maintain the front face of the carrier in vertical position.

The front face of carrier 1 supports a pair of straps that extend from the face forwardly and in horizontal alignment with each other. These straps are curved cylindrically to a form into which a rod may be nested and are of substantial length so as to comprise an extensive seat against which a fishing rod may be pressed. As shown in the drawings, there are two opposed pairs of such straps or cradle members 2—an upper pair which curve upwardly and an opposed lower pair which curve downwardly. Intermediate between each cooperating pair of saddle members 2 is a lug 3 projecting forwardly at a sufficient vertical distance from its respective pair of saddles 2 to receive the maximum size of rod or pole, for example, a tent pole that may be inserted between the tab 3 and against the opposed and cooperating saddle members 2.

Projecting through each of tabs 3 toward the corresponding pair of curved saddle members 2 is a threaded clamping member 5 which, as shown, preferably terminates in a swivel cup 6. A lock nut 5' is placed against tab 3 in cooperative position with bolt 5.

Through the lower portion of the face of carrier 1 opposite the throat formed in the U-base are inserted wing bolts 6 which terminate inwardly in swivel cup washers 8. Opposite swivel washers 8, the rear leg 4 of the U-frame is finished with a resilient surface such as attached rubber or felt pads 7. The purpose of this resilient face is to provide increased friction or gripping power in the simplified form of fender attachment that is provided by the U-members. This gripping action is enhanced by rubber cup 9 which is fastened over the inner face of cup washer 8 on lower bolt 6.

In Figure 3, is shown the present carrier with fish poles of different sorts assembled upon an automobile fender. The bottom of broad face plate 1 of the carrier is drawn against the edge of fender 10 by two swivel bolts 6 which tighten the rear face 7 against the back of the fender edge. It should be observed that the base 1, even though rectilinear as shown, nevertheless is held rigidly against the fender 10. This is true despite the fact that the fender 10, as usual, is arched upwardly and also is curved in various planes. The adaptability of this carrier is illustrated further in Figure 5 where two different carriers 1 are shown tightened at various angles against different fenders, in one case on a fender edge back of the rear wheel and in another case on a front fender. It will be observed that these positions are illustrative and that the carrier might also be mounted in some other heretofore difficult place as, for example, on a bumper. Mounting on a bumper would be facilitated by the re-entrant positioning of the rear base leg 4 in cooperation with the broad expanse of the front face and the swivel bolts 6 at the bottom of carrier 1.

In the assembly, for example, as shown in Figure 3, the upper portion of carrier 1 is shown as a broad cross arm from which the two curved cradle straps 2 extend forwardly as rigid, and preferably integral, elements of the cross arm. Thus, the cradle straps 2 afford an extensive base or support lengthwise of the pole 11, so as by their breadth and by their considerable spacing from each other to minimize the lengthwise sliding of a pole. The cradle straps, further, by their rigidity and integral construction integrally with the cross arm prevent whipping or cross play that would otherwise tend to displace a pole from a carrier. The extensive nesting surface in contact with a pole permits the collars 2 to minimize rotational displacement or loosening of the pole 11 that is secured in the collars. With this rigid support of the collars 2 for the pole 11, the intermediate cup bolt 8 is exceptionally effective when tightened against a pole between the pair of saddles 2.

In use, the carrier is extremely rapid and dependable. The U-base is quickly placed in back of an edge of an exposed part of an automobile, for example, and may be tightened at once whether the edge be straight or be curved, as on a fender or on a bumper. The particular angle at which the carrier is placed imposes no limitation on its use, for the carrier is usable in substantially any position. In the preferred form of the invention, this adaptability is enhanced by the swivel action of the cup face 8 of the bolts 5 or 6. It is a simple operation to place a pole in a pair of cradles 2 and to tighten the pole by a twisting adjustment of the swivel bolt 5. As stated above, there is substantially no whipping or play of the carrier, nor consequential loosening of the rods that are secured in the carrier. It will be evident further, and especially so from Figure 5, that normal use of a car is in no way hindered; that is to say, for example, that the doors of the car may open normally even though extremely long poles are being carried.

It will be evident further from this present discussion taken with the accompanying drawings that manufacture of this item is of extremely simplified nature. Thus, the rear leg of the U-shaped base is readily pressed out or molded integrally with the extensive front face. The formation of this base involves only an exceedingly simple operation. Nevertheless, the angular arrangement of the U-leg 4 about the recess included thereby at the lower end of the face plate 1 imparts important rigidity to the structure. The tabs 3 which extend forwardly from the face of the carrier to secure the locking bolts 5 are likewise simply formed as part of the face 1 and are rigid and effective in part from their central positioning in the face 1. The upper portion of the face 1 readily yields in manufacture sufficient material for formation of the opposed pair of cradles or open collars 2 where such collars are pressed out from the face material. In any event, cradles 2 by their integral construction with the cross arm or upper face 1, whether struck out or molded, are rigid elements.

It is evident that the structure may be attached to other vehicles, for example, to the gunwhale of a boat, as well as to suitable parts of an automobile.

Although, in accordance with the patent statutes, we have described features of this invention by reference to a particular structure thereunder which at present is preferred, it will now become evident to those skilled in the art that departure in detail will be available within the terms of the appended claim.

What we claim is:

Fishing rod carrier for auto vehicles comprising a plate having an elongated base portion with clamp means at its ends adapted to clampably embrace the margin of the fender of an auto vehicle, and having a portion upstanding from the base, said upstanding portion having upper and lower parallel pairs of spaced dished pole seats, the dished sides of the upper pair facing upwardly and the dished sides of the lower pair facing downwardly, screw clamping means, one for each pair of spaced seats, mounted coaxially in a line between the seats of each of said pairs and perpendicular to a plan parallel to said seats, said clamping means being adapted respectively to screw against poles laid against said seats, or to screw against one another in the absence of poles, for keeping said clamping means tight.

FRANK HOWARD DIBBLE.
HAROLD ALLAN BORDEN.